United States Patent
Stephens et al.

(10) Patent No.: US 11,014,098 B2
(45) Date of Patent: May 25, 2021

(54) DEVICE, SYSTEM AND METHODS FOR SEPARATION AND PURIFICATION OF ORGANIC COMPOUNDS FROM BOTANICAL MATERIAL

(71) Applicant: Delta Separations, LLC, Cotati, CA (US)

(72) Inventors: Benjamin Stephens, Santa Rosa, CA (US); Scott Streeter, Santa Rosa, CA (US)

(73) Assignee: Delta Separations, LLC, Cotati, CA (US)

( * ) Notice: Subject to any disclaimer, the term of this patent is extended or adjusted under 35 U.S.C. 154(b) by 0 days.

(21) Appl. No.: 17/068,993

(22) Filed: Oct. 13, 2020

(65) Prior Publication Data
US 2021/0069730 A1    Mar. 11, 2021

Related U.S. Application Data

(63) Continuation of application No. 15/672,490, filed on Aug. 9, 2017, now Pat. No. 10,814,338.

(51) Int. Cl.
*B04B 11/06* (2006.01)
*B04B 3/00* (2006.01)
(Continued)

(52) U.S. Cl.
CPC .......... *B04B 11/06* (2013.01); *B01D 11/0269* (2013.01); *B01D 11/0273* (2013.01);
(Continued)

(58) Field of Classification Search
CPC .... B04B 7/12; B04B 5/12; B04B 9/06; B04B 11/02; B04B 5/08; B04B 2005/125;
(Continued)

(56) References Cited

U.S. PATENT DOCUMENTS 3,100,191 A * 8/1963 Smith ................... D06F 43/085
68/18 F
3,453,083 A    7/1969 Beerli
(Continued)

FOREIGN PATENT DOCUMENTS

| CN | 105251234 A | 1/2016 |
|---|---|---|
| GB | 571973 A | 9/1945 |
| JP | 2009039685 A | 2/2009 |

*Primary Examiner* — Walter D. Griffin
*Assistant Examiner* — Shuyi S. Liu
(74) *Attorney, Agent, or Firm* — Dickinson Wright, PLLC; Michael E. Noe, Jr.; James P. Purrington (57) ABSTRACT

The botanical extraction and purification device described in this patent provide the ability to extract and purify botanical compounds from a diverse plant species through specially crafted process sequences that effectively reach the desired botanical component despite differences in botanical material types and unique differences in organic chemical characteristics. The technological package consists of two main processing centers; each is a combination of process features that can be personalized to effectively address unique extraction requirements. When combined, the extraction processes deliver capabilities in product throughput speed and product purity not available using previously available separation methods. The first component of this package is a CUP that transfers chemical compounds from botanical material into a solvent. The second component is an AISP. This device separates unwanted botanical compounds from the solvent, resulting in a relatively pure plant extract.

18 Claims, 4 Drawing Sheets

(51) Int. Cl.
  *B04B 9/02* (2006.01)
  *C11B 1/10* (2006.01)
  *B04B 11/08* (2006.01)
  *B01D 11/02* (2006.01)
  *B04B 11/04* (2006.01)
  *B04B 7/02* (2006.01)

(52) U.S. Cl.
  CPC .............. *B04B 3/00* (2013.01); *B04B 7/02* (2013.01); *B04B 9/02* (2013.01); *B04B 11/04* (2013.01); *B04B 11/082* (2013.01); *C11B 1/10* (2013.01)

(58) Field of Classification Search
  CPC ........ B01D 45/12; B01D 45/14; F01M 13/04; F01M 11/03; F01M 2013/0422; B01F 9/00
  USPC ....... 210/378, 379, 772, 774, 781, 909, 790, 210/196; 554/13, 21
  See application file for complete search history.

(56) References Cited

U.S. PATENT DOCUMENTS

| | | |
|---|---|---|
| 3,669,879 A | 6/1972 | Berriman |
| 4,286,748 A | 9/1981 | Bailey |
| 4,894,171 A | 1/1990 | Nichols |
| 5,163,895 A | 11/1992 | Titus |
| 5,713,826 A | 2/1998 | West |
| 5,743,840 A | 4/1998 | Carr |
| 5,908,376 A | 6/1999 | Macaluso et al. |
| 6,740,027 B1 | 5/2004 | Benson |
| 7,229,549 B2 | 6/2007 | Grimwood |
| 7,601,112 B2 * | 10/2009 | Jackson ................ B08B 3/06 494/37 |
| 7,622,140 B2 | 11/2009 | Whittle et al. |
| 8,574,143 B2 | 11/2013 | Astheimer et al. |
| 9,005,097 B2 | 4/2015 | Feng et al. |
| 9,239,525 B2 | 1/2016 | Owa |
| 9,765,000 B2 | 9/2017 | Nadal Roura |
| 2007/0235447 A1 | 10/2007 | Cheung |
| 2010/0158842 A1 | 6/2010 | Wille, Jr. |
| 2013/0199248 A1* | 8/2013 | Vanhazebrouck ...... D06F 13/00 68/134 |
| 2014/0314883 A1 | 10/2014 | Rogez et al. |
| 2017/0128855 A1 | 5/2017 | Buese et al. |
| 2017/0356022 A1* | 12/2017 | Khan .................... C12M 27/02 |
| 2018/0028019 A1* | 2/2018 | Hou ........................ B01F 3/12 |
| 2019/0099736 A1 | 4/2019 | Sibal |
| 2020/0188812 A1 | 6/2020 | Galyuk |

* cited by examiner

DEVICE, SYSTEM AND METHODS FOR SEPARATION AND PURIFICATION OF ORGANIC COMPOUNDS FROM BOTANICAL MATERIAL

This application is a continuation of U.S. application Ser. No. 15/672,490, filed Aug. 9, 2017, which is incorporated herein by reference in its entirety.

FIELD OF THE INVENTION

The invention generally relates to separation and purification processes, and more particularly, to devices, systems, and methods for separation and purification of organic compounds from botanical materials.

BACKGROUND OF THE INVENTION

Plants have historically been a resource for compounds with medicinal and commercial value. The compounds are typically made available through an extraction process that can begin with coarse separation of plant material to minimize the volume that typically undergoes one or more refined separation processes. The refining processes utilize physical and or chemical differences to dissociate desired plant materials, from supporting material. Physical separation characteristics include differences in density, hardness and shape. Chemical separation characteristics include differences in solubility, vapor pressure, reactivity and combustion. A successful plant extraction methodology generally minimizes: cost, time, waste and cross contamination or unwanted toxicology. Many time proven processes continue to be used today. Others have evolved as technology improvements occur.

SUMMARY OF THE INVENTION

The novel process described in this patent improves upon the work of others by reducing processing time and increasing product quality in an environmentally friendly way. The technology described in this document provide the ability to extract and purify botanical compounds from a diverse plant species. The solvent based extraction technology can isolate specific compounds with medicinal and/or commercial value through specially crafted process sequences that effectively reach the desired botanical component despite differences in botanical material types and unique differences in organic chemical characteristics.

The technological package consists of two main processing centers; each is a combination of process features that can be personalized to effectively address unique extraction challenges. When combined, the extraction processes deliver capabilities in product throughput speed and product purity not available using previously available separation methods. The first component of this package is a Centrifuge Utility Platform (CUP) and the second component is an Adsorption Interface and Separation Platform (AISP).

This combination of processing centers provides an ideal methodology for organic compound extraction from botanical material by delivering a personalized methodology that effectively liberates the desired pharmacological compound(s) or commercial product from plants despite their dramatically different anatomical characteristics. In some applications, a gentle surface wash of plant material is the optimal way to dislodge oils or resinous nodules that are loosely affixed to plant surfaces. In other situations, a bath with vigorous agitation is necessary to dislodge compounds that are imbedded deeply within the plant material. The CUP provides both spray and wash cycles to meet these requirements. The AISP is the second portion of the overall extraction and purification process. Once again, this multi-faceted process is configured to meet the requirements of purification associated with a specific end product requirement. This process typically includes several extractions, each focused on separating the desired compounds from unwanted materials dissolved or suspended in the extraction solvent.

DETAILED DESCRIPTION OF THE EMBODIMENTS

This integrated extraction and purification process was developed to address the problems with the prior art and conventional technologies, methods, systems, processes, and related apparatus. As will be described herein and disclosed in the examples, the contemplated systems and processes for plant material extraction and purification are novel and non-obvious.

The technological package consists of two main processing centers; each is a combination of process features that can be personalized to effectively address unique extraction challenges. When combined, the extraction processes deliver capabilities in product throughput speed and product purity not available using previously available separation methods. The first component of this package is a CUP and the second component is an AISP.

Figure 1:
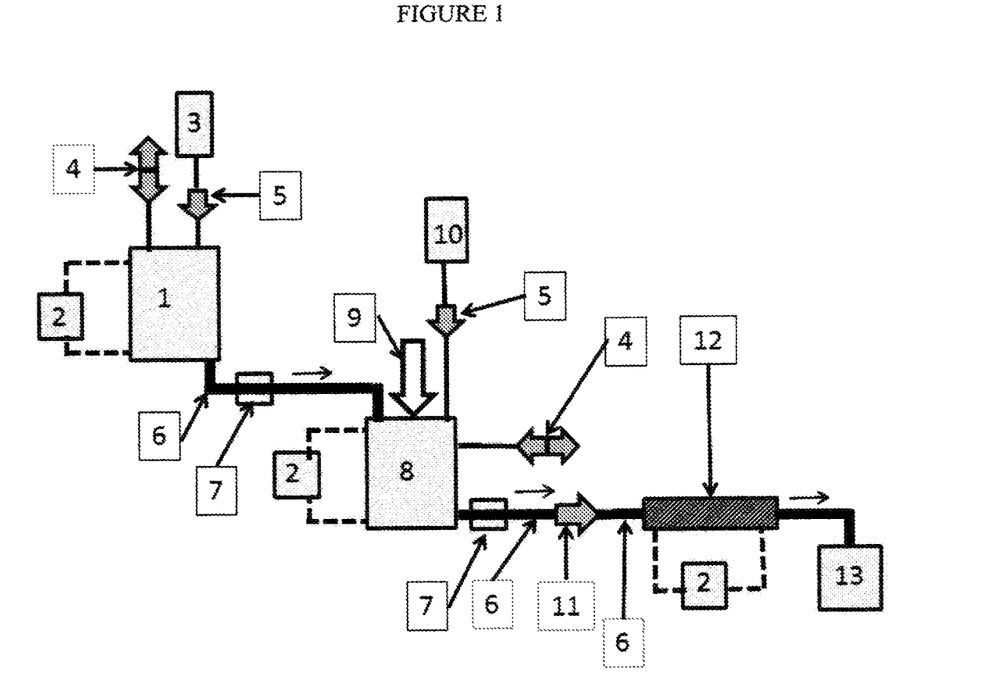
FIG. 1 illustrates an exemplary embodiment of an integrated package of a contemplated botanical material separation and purification equipment.

FIG. 1 illustrates a botanical extraction and purification device, which includes a CUP 1, heating/refrigeration modules 2, solvent "A" storage container 3, gas vacuum/pressure pumps 4, chemical metering pumps 5, product transfer lines 6, valves 7, AISP 8, granular material introduction 9 into the AISP, solvent "B" storage container 10, chemical transfer pump 11, filter assembly 12, and a product storage container 13.

This combination of processing centers provides an ideal methodology for organic compound extraction from botanical material by delivering a personalized methodology that effectively liberates the desired pharmacological compound(s) or commercial product from plants despite their dramatically different anatomical characteristics. In some applications, a gentle surface wash of plant material is the optimal way to dislodge/dissolve lipids or resinous nodules that are loosely affixed to plant surfaces. In other situations, a bath with vigorous agitation is necessary to dislodge compounds that are embedded deeply within the plant material. The CUP provides both spray and wash cycles to meet these requirements.

In the wash mode, most of the extraction of the botanical compounds from plant material is the direct result of the solvent flow through the plant material caused by the juxtaposition of earth gravity and centripetal gravity created in the basket. The repeated abrupt reversals in the baskets tangential and rotational velocity result in sequentially opposing centripetal forces. The cyclic interaction of the effect of earth gravity and gravity created through centripetal force on the solvent within the vessel alternately pulls and pushes solvent away from and toward the central axis of the centripetal force. As the solvent passes through the plant material it adsorbs or absorbs organic compounds. When operating in spray mode, the majority of the plant compound extraction occurs when solvent is sprayed onto the plant material and then pulled through the plant material with centripetal force generated by rotation of the basket containing the plant material; or when solvent containing botanical material is sprayed upon a filter material within the rotating CAP basket. The solvent is pulled through the accumulated botanical material on the filter material by centripetal forces that result from CAP basket rotation.

Figure 2:
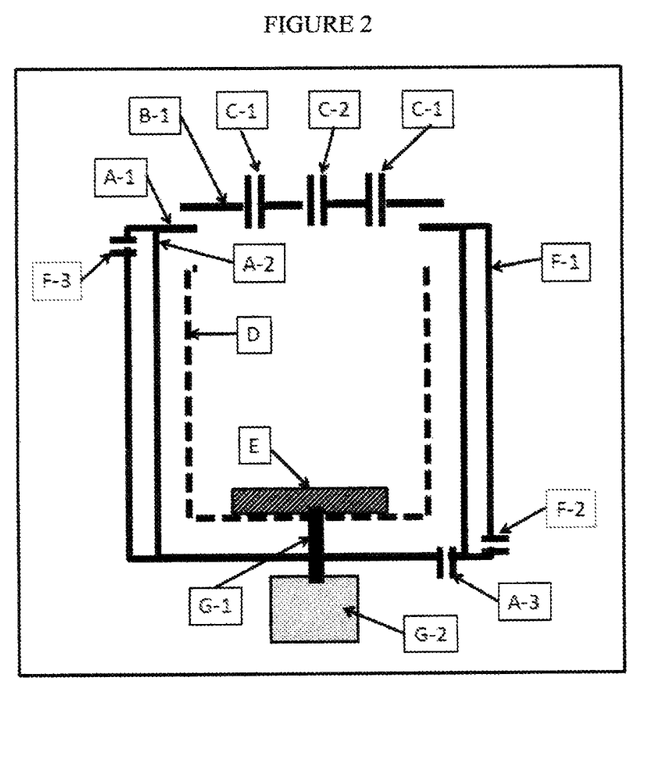
FIG. 2 illustrates an exemplary embodiment of a contemplated CUP in the wash mode of operation, which is designed to extract organic compounds from difficult to access botanical material.

FIG. 2 illustrates the CUP, which includes an openable end (A-1), including side walls (A-2), drain fitting (A-3) with valve, main sealable lid (B-1) to open the CUP, access port (C-1) with valve for liquids or gases, access port (C-2) with valve for liquids and connection point for the liquid distribution wand, perforated basket (D), agitation inducing device (E) affixed to the bottom of the perforated basket (E), outer wall of thermal jacket (F-1) for heating/cooling fluid to transfer heat in or out of material within the vessel, low access point (F-2) for fluid transfer in/out of the thermal jacket (F-1), high access point (F-3) for fluid transfer in/out of the thermal jacket (F-1), shaft (G-1) to impart motion to the basket (D) from the motor (G-2). Shaft (G-1) has a gasket at point of contact with vessel wall. The motor (G-2) can have variable speed and direction control.

The CUP is a device with a closed vessel of a size appropriate for the quantity of product being processed. The processing portion of the device is a vessel, preferably cylindrical, with a sealed access door at one end. The vessel has several orifices for the introduction and removal of liquids or gases. A basket, preferably cylindrical, is placed within the vessel and can bi-directionally rotate along its cylindrical axis at varying speeds as required to generate centripetal force within the basket. The basket is open on the end and perforated along the sides. The open end of the basket is aligned with the openable end of the vessel. The bottom of the basket contains raised elements that contribute to the agitation to the liquid and products within the basket when the basket is rotated. The rate of motion of the basket is monitored and regulated by an integrated process control. Most of the agitation happens from the counter current force of the solvent moving in and out of the material when the centripetal force pulls it out, and then rushes back in when the direction changes.

Figure 3:
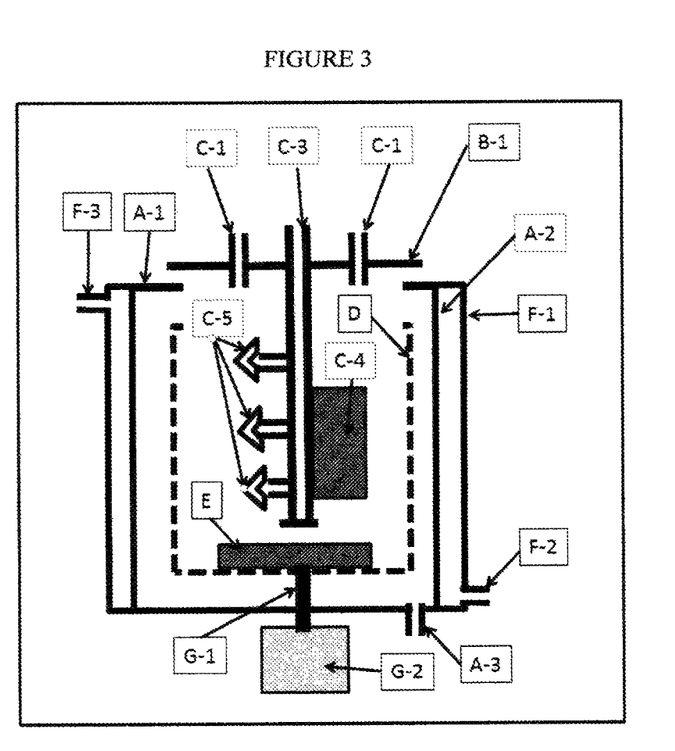
FIG. 3 illustrates an exemplary embodiment of a contemplated CUP in the spray mode of operation, which is designed to capture organic compounds that are loosely attached to plant surfaces.

FIG. 3 illustrates the CUP, which can further include the openable end (A-1), side walls (A-2), drain fitting (A-3), main sealable lid (B-1), secondary sealable opening in the lid for open end of the CUP, access port (C-1) with valve for liquids or gases, access port with valve for liquids and connection point for the liquid distribution wand, access port (C-3) for liquids with valve and attached liquid distribution wand, paddle(s) (C-4) attached to the liquid distribution wand, spray nozzles (C-5) attached to the liquid distribution wand, perforated basket (D), agitation inducing device (E) affixed to the bottom of the perforated basket, outer wall of thermal jacket (F-1) for heating/cooling fluid to transfer heat in or out of material within the vessel, low access point (F-2) for fluid transfer in/out of the thermal jacket, high access point (F-3) for fluid transfer in/out of the thermal jacket, shaft (G-1) to impart motion to the basket (D) from the motor (G-2). Shaft has gasket at point of contact with vessel wall. The motor (G-2) can have variable speed and direction control.

When the CUP is used in spray mode for gentle surface wash of botanical material, a pre-determined amount of plant material is placed into a mesh enclosure that is of the same shape and slightly smaller size as the rotating basket. The mesh enclosure has one open end. The mesh enclosure is placed into the basket with the open end facing the same direction as the basket opening. The mesh enclosure is filled not more than to pre-determined quantity with plant product. A specialized liquid distribution wand consisting of a straight shaft with any number of sides is affixed to an attachment point on the inside of the vessel lid. The attachment point of this stationary wand aligns with the centerline of the rotating basket. The wand is equipped with paddles and nozzles in various configurations. The paddles even the botanical product distribution within the basket when rotating and the nozzles spray solvent onto the botanical product as it is rotating. The rotation pulls the solvent through the plant material and the basket wall where it then falls to the sump for recirculation if desired. Rotational speed and direction can be adjusted to optimally move the solvent through the plant material. The process is continued until a selective solvent exposure residence time is obtained. The residence time varies by plant material type.

The gentle plant material spray cycle is programmable to meet specific product requirements. Variables include: solvent spray temperature, velocity and duration, as well as basket rotational speed and duration of rotation. Some variations of the device include control of the vessel temperature through an external jacket that can be flushed with warm or cold liquid.

The CUP can also be used as a centrifugal filter during spray mode. When this option is elected a liner of appropriate filter material is added to the inside of the rotating drum. Solution with suspended solids is sprayed into the rotating drum. The solids accumulate on the filter material and solvents are pulled through the filter cake by centripetal force. The filter cake can then be washed with a solvent prior to drying with heat and vacuum. Drying can also include the introduction of air or inert gas when air or the absence of oxygen contributes to the production of a desired organic compound.

In yet another application, the CUP can be used to remove liquids from botanical material previously exposed to moisture by another process. In this option plant material is placed within the drum without a filter material liner. Centripetal force of varying force and duration is used to pull the adsorbed liquids away from the botanical material and through the perforated basket wall where it falls to the bottom of the CUP vessel. The liquid removed from the plant material can be transferred to another container for additional processing. The specialized liquid distribution wand need not be installed unless additional spray washing is desired. Drying can also include the introduction of air or inert gas when air or the absence of oxygen contributes to the production of a desired organic compound.

The CUP is used in wash mode when more aggressive agitation of the botanical material is required to release the desired organic compounds. When in wash mode, the straight wand described above is removed and the entire basket is filled with a mesh enclosure with two ends. One end is fixed and the other is removable to allow the introduction/removal of shredded plant material. In this application, the mesh bag is filled with plant material. Effective extractions require plant partitioning in a way that optimize solvent exposure to the plant surface areas expected to contain the desired organic compounds. The mesh enclosures can be filled in advance to minimize equipment down time.

When the CUP wash mode is selected solvents fill the vessel after the product filled mesh bag is placed within the basket and the vessel lid is closed. The basket is bi-directionally rotated at a predetermined rate and for a defined duration. The washing process includes an intermittent draining of the solvent followed by a high speed spin. This sequence pulls the imbedded solvent out of the plant material by centripetal force of varying intensities and duration prior to a re-introduction of the solvent or new solvent for a second or third washing.

The wash cycle program is crafted to meet the requirements of the plant material being processed by integrating wash cycle length, agitation direction and speed as well as solvent temperature and centrifugal spin cycle force and duration. Some variations of the device include control of the vessel temperature through an external jacket that can be flushed with warm or cold liquid.

Additional fittings are provided on the vessel. Three are provided on the lid of the vessel to accommodate the addition of more than one solvent during washing and to compensate for gas pressure within the vessel as liquid is added or removed. A drain fitting is placed at the bottom of the vessel for gravity feed release of solvents.

Figure 4:
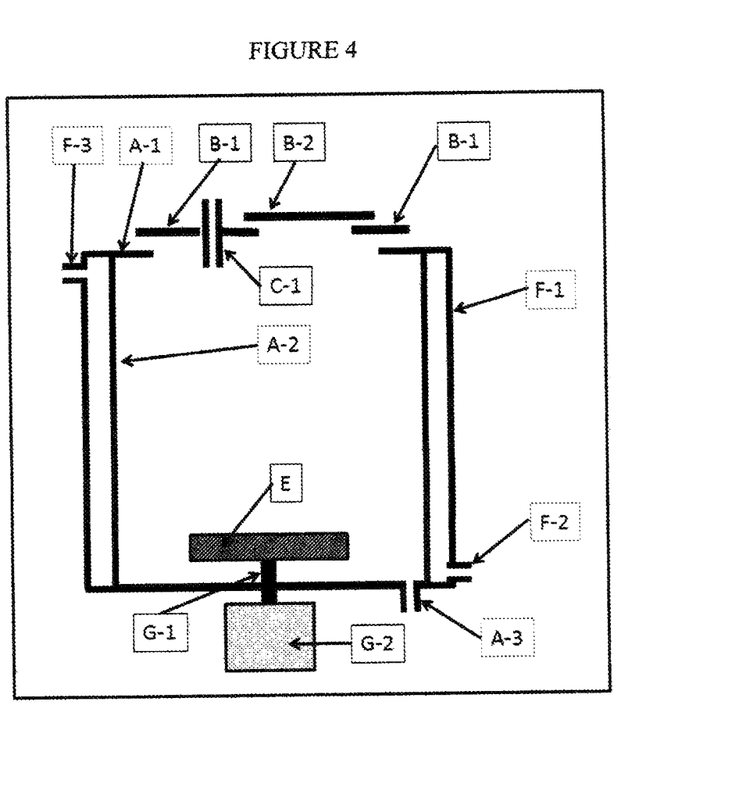
FIG. 4 illustrates an exemplary embodiment of a contemplated AISP, which is an integral part of the botanically based molecule purification process.

FIG. 4 illustrates an embodiment of the AISP assembly, which includes the openable end (A-1), side walls (A-2), drain fitting (A-3), main sealable lid (B-1), secondary sealable door or opening (B-2), access port (C-1), agitation inducing device (E), outer wall of thermal jacket (F-1), low access point (F-2), high access point (F-3), and shaft (G-1) to impart motion to the basket from the motor (G-2).

The CUP vessel is designed to be operated at a vacuum or pressure during either the spray or wash cycle. This allows the vessel to be purged with inert gas when oxygen or other gases within air interfere with the process. It also allows the introduction of pressure and temperature swings to enhance solubility and or precipitation.

All components of the CUP system can be made in accordance with sanitary standards. This includes the choice of materials and method of fastening hoses or pipes to the vessel.

The AISP is the second portion of the overall extraction and purification process. Once again, this multifaceted process is configured to meet the requirements of purification associated with a specific end product requirement. This process typically includes several extractions, each focused on separating the desired compounds from unwanted materials dissolved or suspended in the extraction solvent.

The AISP is a vessel sized according to the quantity of material being processed. It is preferably cylindrical with a fixed bottom, openable top and solid side walls. The vessel includes several orifices for the introduction and removal of liquids and solids. The vessel is designed to operate under pressure and vacuum. It can also be heated or cooled by flushing with warm or cold liquid through an external jacket. Sealable openings in the vessel lid are used for the introduction of one or more solvents and the addition of one or more filtering agents. Fittings are also provided to compensate for changes in the liquid level within the vessel and/or adjusting the vessel pressure/vacuum. Inert gases can be used where oxygen in the air will interfere with the product. Liquid within the vessel can be agitated or mixed at various speeds for a specified time.

The typical AISP sequence of operation includes heating or cooling of the vessel followed by the introduction of the solvent laden with desired product collected from the CUP process. A filtering agent designed to adsorb or react with a target impurity or type of impurities is added to the vessel prior to adjusting the vessel pressure/vacuum. The solvent and filtering/reacting agent are mixed according to a sequenced agitation program. The treatment program typically includes mixing at varying intensifies followed by pause periods that repeat for a determined period of time.

At the completion of the adsorption/reaction process, the pressure/vacuum is changed as necessary to push the liquid and adsorbent/reactant from a fitting located on the bottom of the vessel. This liquid is then passed through one or more filtering devices designed to separate the filtering agent from the solvent. This process is continued as required to meet the product quality requirements.

All components of the AISP system are made in accordance with sanitary standards. This includes the choice of materials and method of fastening hoses or pipes to the vessel.

The solvent used in this process is then further cleaned through distillation, if necessary, before being reused on a subsequent separation process.

The contemplated disclosures may be combined among themselves and/or with other known/conventional extraction and purification processes.

In summary, contemplated embodiments provide several advantages in separation and extraction applications over other available and conventional technologies. The CUP device provides the ability to perform four distinctly different functions using the same platform:

Access organic molecules deeply imbedded in botanical material through full emersion and bi-directional agitation in solvent. The solvent is then removed from the plant material by tank draining followed by centripetal force applied to the basket containing the plant material.

Access to organic resins and dust superficially attached to botanical material through spray wash combined with centripetal force to move solvent through and out of the plant material.

Separation of suspended solids from a liquid and then wash the filter cake material with solvent spray that is pulled through the filter cake and filter membrane with centripetal force.

Centripetal separation of adsorbed liquids on plant material.

The following Examples illustrate how the embodiments disclosed herein can be utilized; however, it should be understood that these Examples are not limiting and are used to show some of the specific embodiments that are a part of the broad scope of the technology disclosed herein.

EXAMPLES

Example 1

"Kava" or "Kava-Kava" (Piper methysticum) is a root plant that has been used for social drinks and medicinal purposes sedative, anesthetic, euphoriant, and entheogenic for thousands of years. The plant is typically grown in the South Pacific and is now commercially available in most of the world. Kavalactones are the compounds responsible for the desired physiological effects associated with the plant.

The kavalactones are predominantly located in the plant roots. The dried root material is a fibrous material with a composition of 43% starch, 20% fiber, 15% kavalactones, 12% water, 3.2% sugars, 3.6% protein and 3.2% minerals. Traditional extraction of the kavalactones involves converting the material to powder that is suspended in water. The traditional methodology is ineffective because it does not extract the oil soluble kavalactones. The CUP process using the wash methodology with methanol as a solvent overcomes this challenge because both water and oil soluble kavalactones are dissolved in this alcohol. The turbulent agitation and deep soaking provided by this CUP wash mode is ideal for separating the kavalactones from the fibrous plant material. The alcohol liquor is then purified to remove unwanted plant material in the AISP process utilizing carbon.

Example 2

Papers presenting ethnobotany of the South Pacific report many ferns have medicinal uses for ailments such as rheumatism, asthma, gynecology and digestion. The frond portion of the plant is the source for oils and other organic compounds with medicinal efficacy. The CUP technology in spray mode is ideal for the separation and capture of spores and oils from sporangium of the sorus structures on a fern frond. The spray technology projects solvents through nozzles affixed to a stationary wand that aligns with the centerline of the rotating basket. This configuration places solvent on the surface and has sufficient force to dislodge partially sealed sporangium structures and yet minimizes the capture of unwanted chlorophyll and other plant matter that would be accumulated if extractions were done using a wash method. In this application the spray is accompanied with rotation in alternating directions. The centrifugal motion pulls the sprayed solvent through the plant matter and rotation change enhances a more comprehensive exposure to the solvent.

Example 3

Differential separation is another feature of the CUP device. The application can separate botanical fibers and some cells/large cell fragments from liquids used as solvents in examples #1 and #2 above. In this application, the addition of a mesh container of the same shapes but slightly smaller size than the basket. The mesh container has a bottom, sides and a top that can be closed. The mesh container is fabricated with opening sizes as required to effectively filter material placed within the container. In this application, the liquid containing botanical material of small diameter is sprayed through nozzles affixed to a stationary wand that aligns with the centerline of the rotating basket. The solid material from the sprayed liquid accumulates on the filter medium and the liquid portion of the spray continues through the filter cake and filter medium because of basket centripetal force. The application includes the option of rinsing the filter cake with clean solvent prior to drying. The drying process can include the introduction of warm gas through one orifice in the vessel and extracting the gas with solvent fumes through another orifice at different vessel location.

In the foregoing specification, the invention has been described with reference to specific exemplary embodiments thereof. It will, however, be evident that various modifications and changes may be made thereunto without departing from the broader spirit and scope of the invention as set forth in the appended claims. The specification and drawings are accordingly to be regarded in an illustrative rather than in a restrictive sense.

What is claimed is:

1. A device for botanical extraction, the device comprising:

a centrifuge utility platform (CUP) comprising:

a CUP vessel having an axis, an open vessel end with a sealable lid, a wall and a bottom with a drain;

a perforated basket located inside the CUP vessel, the perforated basket is rotatable relative to the CUP vessel, the perforated basket has an open basket end and a perforated wall, and the perforated basket is configured to drain solvent and retain plant matter after operation of the device;

an agitation device affixed to the perforated basket, the agitation device has an axial length that is less than an axial length of a shaft of the motor, and the agitation device has an outer diameter than is less than an inner diameter of the perforated basket;

a motor coupled to the perforated basket, wherein the motor is configured to bi-directionally rotate the perforated basket and centrifuge plant matter inside the perforated basket; and a thermal jacket disposed around the CUP vessel and configured to circulate a fluid to cool material within the CUP vessel; and a refrigeration module in fluid communication with the thermal jacket and configured to cool the fluid for cooling the material within the CUP vessel.

2. The device of claim 1, wherein the CUP is configured to rotate the perforated basket at a predetermined rate and for a defined duration.

3. The device of claim 1, wherein the CUP is configured to intermittently drain solvent followed by spin cycles.

4. The device of claim 1, wherein the CUP is configured to remove imbedded solvent from the plant matter by centripetal force of varying intensities and durations prior to applying more solvent for additional processing of the plant matter.

5. The device of claim 1, wherein the refrigeration module is further configured to heat the fluid for heating the material within the CUP vessel.

6. The device of claim 1, wherein the perforated basket is cylindrical and configured to support a removable cartridge that can be installed in and removed from the perforated basket with plant matter inside the removable cartridge.

7. The device of claim 6, wherein the removable cartridge comprises a mesh enclosure that is shaped like and smaller in size than the perforated basket.

8. The device of claim 1, further comprising an additional filter membrane surrounding an interior of the perforated basket, and the additional filter membrane is smaller in size than the perforated basket.

9. The device of claim 1, further comprising a filter assembly configured to be coupled to the CUP downstream of the CUP.

10. A system for botanical extraction, the system comprising:

a centrifuge utility platform (CUP) comprising:

a CUP vessel having an axis, an open vessel end with a sealable lid, a wall and a bottom with a drain;

a perforated basket located inside the CUP vessel, the perforated basket rotates relative to the CUP vessel, the perforated basket has an open basket end and a perforated wall, and the perforated basket supports a removable cartridge of plant matter, drains solvent, retains plant matter in the removable cartridge after operation of the device, and allows removal of the removable cartridge of plant matter from the perforated basket;

an agitation device affixed to the perforated basket; and a motor bi-directionally rotates the perforated basket and centrifuges plant matter inside the perforated basket;

wherein the agitation device has an axial length that is less than an axial length of a shaft of the motor, and the agitation device has an outer diameter than is less than an inner diameter of the perforated basket.

11. The system of claim 10, wherein the CUP rotates the perforated basket at a predetermined rate and for a defined duration.

12. The system of claim 10, wherein the CUP intermittently drains solvent followed by spin cycles.

13. The system of claim 10, wherein the CUP removes imbedded solvent from the plant matter by centripetal force of varying intensities and durations prior to applying more solvent for additional processing of the plant matter.

14. The system of claim 10, further comprising a heating and refrigeration module coupled to the CUP.

15. The system of claim 10, wherein the perforated basket is cylindrical, and the removable cartridge comprises a mesh enclosure that is shaped like and smaller in size than the perforated basket.

16. The system of claim 10, further comprising an additional filter membrane surrounding an interior of the perforated basket, and the additional filter membrane is smaller in size than the perforated basket.

17. The system of claim 10, further comprising a filter assembly coupled to the CUP downstream of the CUP.

18. A system for botanical extraction, the system comprising:

a centrifuge utility platform (CUP) comprising:
  a CUP vessel having an axis, an open vessel end with a sealable lid, a wall and a bottom with a drain;
  a perforated basket located inside the CUP vessel, the perforated basket rotatable relative to the CUP vessel, the perforated basket has an open basket end and a perforated wall, and the perforated basket supports a removable cartridge of plant matter, drains solvent, retains plant matter in the removable cartridge after operation of the device, and allows removal of the removable cartridge of plant matter from the perforated basket;
  an agitation device affixed to the perforated basket, and the agitation device has an axial length that is less than an axial length of a shaft of the motor;
  a motor coupled to the perforated basket and configured to bi-directionally rotate the perforated basket to centrifuge plant matter inside the perforated basket; and
  a thermal jacket disposed around the CUP vessel and configured to circulate a fluid for heating or cooling material within the CUP vessel; and a heating or refrigeration module in fluid communication with the thermal jacket and configured to heat or cool the fluid for heating or cooling material within the CUP vessel.

\* \* \* \* \*